US007689002B2

(12) United States Patent
Milgram et al.

(10) Patent No.: US 7,689,002 B2
(45) Date of Patent: Mar. 30, 2010

(54) METHOD OF DETECTING BENDS ON A ROAD AND SYSTEM IMPLEMENTING SAME

(75) Inventors: Maurice Milgram, Paris (FR); Didierl Dumoncel, LaQueueLezYvelines (FR); Catherine Achard, Enghien (FR); William Ivaldi, Montcourt Fromonville (FR)

(73) Assignee: Valeo Vision, Bobigny Cedex (FR)

( * ) Notice: Subject to any disclaimer, the term of this patent is extended or adjusted under 35 U.S.C. 154(b) by 1102 days.

(21) Appl. No.: 10/743,444

(22) Filed: Dec. 19, 2003

(65) Prior Publication Data

US 2004/0136568 A1 Jul. 15, 2004

(30) Foreign Application Priority Data

Dec. 20, 2002 (FR) .................................. 02 16431

(51) Int. Cl.
*G06K 9/00* (2006.01)
(52) U.S. Cl. ..................... 382/104; 382/291; 382/194
(58) Field of Classification Search .................. None
See application file for complete search history.

(56) References Cited

U.S. PATENT DOCUMENTS

| 5,301,115 | A | * | 4/1994 | Nouso ........................ 701/300 |
| 5,550,717 | A | * | 8/1996 | Liao ........................... 362/467 |
| 5,922,036 | A | * | 7/1999 | Yasui et al. .................... 701/28 |

(Continued)

FOREIGN PATENT DOCUMENTS

| DE | 101 27 324 A1 | 12/2002 |
| EP | 1 193 125 A2 | 9/2001 |

OTHER PUBLICATIONS

Lin et al. "A Robust landmark-based system for vehicle location using low-bandwidth vision" Robotic and Autonomous Systems, Elsevier Science Publishers, Amsterdam, NL, vol. 25 No. 1-2, Oct. 31, 1998, pp. 19-32, XP 2 (1998) 19-32.

(Continued)

*Primary Examiner*—Brian Quang Le
*Assistant Examiner*—Claire Wang
(74) *Attorney, Agent, or Firm*—Morgan & Finnegan, LLP

(57) ABSTRACT

The invention concerns a method of detecting from a vehicle a bend in a road comprising a surface and road edges, comprising the following operations:
    taking an image of a road scene unfolding in front of the vehicle and at least partly illuminated by the vehicle,
    determining, for each pixel in the image a light decrease gradient,
    analysing these decrease gradients and determining an image of the road edges,
    mathematically discriminating the gradients from the image of the road edges,
    analyzing this discrimination and determining edges, and an angle of the bend.

The invention also concerns a system for implementing the method of the invention comprising a camera mounted in the vehicle, an image processing unit and a neural network.

30 Claims, 5 Drawing Sheets
(4 of 5 Drawing Sheet(s) Filed in Color)

U.S. PATENT DOCUMENTS

| | | | |
|---|---|---|---|
| 5,991,427 A * | 11/1999 | Kakinami et al. | 382/104 |
| 6,459,387 B1 | 10/2002 | Kobayashi et al. | |
| 6,501,856 B2 * | 12/2002 | Kuwano et al. | 382/194 |
| 6,819,779 B1 * | 11/2004 | Nichani | 382/104 |
| 2002/0080618 A1 | 6/2002 | Kobayashi et al. | |
| 2003/0123706 A1 * | 7/2003 | Stam et al. | 382/104 |

OTHER PUBLICATIONS

Masaki, I. "Three Dimensional Vision System for Intelligent Vehicles" Industrial Electronics, Control, and Instrumentation, 1983. Proceedings of the IECON 1993, International Conference on Maui, HI USA Nov. 15-19, 1993.

Del Bimbo A, et al. "Dynamic Neural estimation for Autonomous Vehicles Driving" Pattern Recognition, 1992. vol. II. Conference B: Pattern Recognition Methodology and System, Proceedings,. 11th IAPR International Conference on the Hague, Netherlands Aug. 30-Sep. 2, 1992 Los Alamitos, CA, USA, IEEE Aug. 30, 1992 pp. 350-354.

* cited by examiner

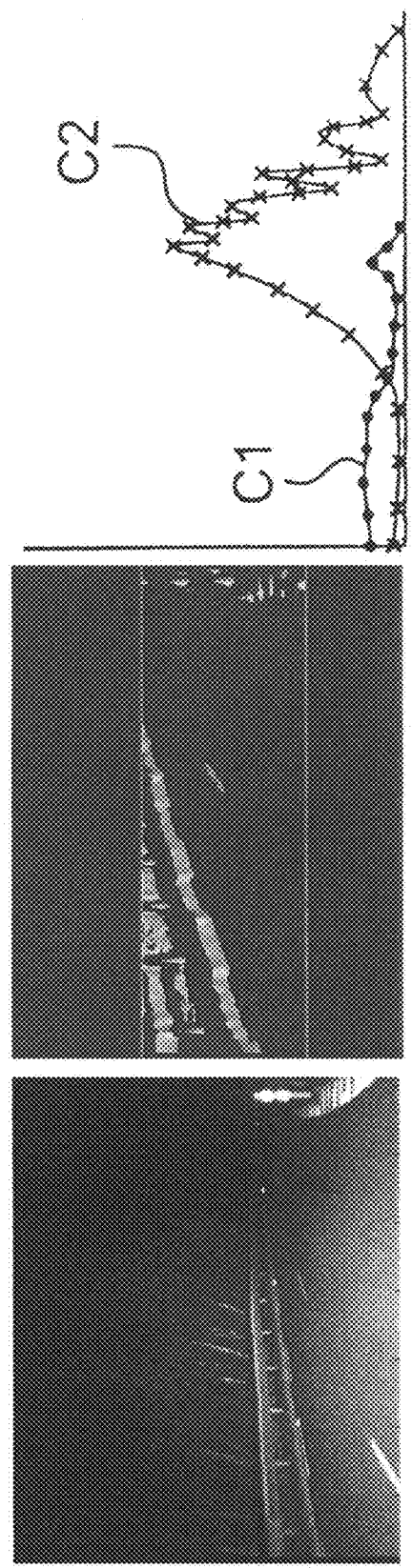

METHOD OF DETECTING BENDS ON A ROAD AND SYSTEM IMPLEMENTING SAME

FIELD OF THE INVENTION

The invention concerns a method for detecting, from a vehicle, the bends on a road in order to pre-orient the illumination of the road by the vehicle headlights. The invention also concerns a system for implementing this method.

The invention finds applications in the field of vehicles travelling on roads such as, for example, cars or heavy goods vehicles. It finds, in particular, applications in the field of the projection of light by such vehicles.

PRIOR ART

Having regard to the large number of vehicles travelling on the roads, it is necessary to procure for these vehicles the best adapted lighting possible in order to reduce the risk of accidents. In particular at night, it is important for the driver to be able to have optimum vision of the road extending in front of him as well as of the sides of this road. In other words, for questions of safety, it is sought to improve the illumination of the road situated in front of the vehicle and thus to improve the vision of the road scene by the driver of the vehicle. This improvement is achieved in particular by an anticipation of the illumination of the road.

At the present time, on the majority of cars, the vehicle lighting beams are fixed. They therefore illuminate to the front of the vehicle. Because of this, on bends, the useful part of the road does not necessarily appear in the vehicle light beam. To resolve this problem, it is sought to orient the light emitted by the vehicle headlights according to the geometry of the road. In other words, it is sought for the headlights to "follow" the road, that is to say for them to illuminate straight in front of the vehicle when the road is straight and for them to illuminate in front of the vehicle to the right or left when the road forms a bend respectively to the right or left.

For this purpose, a first technique consists of sending light on the sides of the road, that is to say on the edges of the road. This may be achieved by means of supplementary fixed headlights which are switched on only when a bend is detected. The intensity of the illumination is inversely proportional to the radius of the bend. Only the supplementary headlight internal to the bend is switched on. The control of the illumination comes from the steering wheel angle sensor.

Another technique consists of making the main beam of the headlight movable by virtue of a motor which turns according to information coming from the vehicle. Lighting devices comprising such movable headlights are known. They enable the illumination to follow the road. In general, such devices use information available on the vehicle in order to determine the geometry of the road. Some of these devices include an angle sensor at the steering wheel which supplies information on the path followed by the vehicle. With such a device, the illumination of the road is a function only of the behaviour of the driver. For example, if the driver turns the vehicle steering wheel to the right, then the vehicle headlights are directed to the right of the road, considering that it is a case of a bend to the right. If the driver does not move the steering wheel, the headlights illuminate straight in front of the vehicle. On the other hand, if the driver inopportunely gives an impulse to the steering wheel, for example by turning round for a moment or taking an object out of the glove box, the orientation of the headlights is modified whilst the geometry of the road is not modified. In addition, the information relating to the change in direction is picked up at the very time when the vehicle enters the curve of the bend. It is therefore supplied to the headlight motor with a moment of delay. Consequently the device exhibits a delay on the triggering of the lighting on the curve, which results for the driver in a sensation of tardy arrival of the light beam at the entry to the bend and by an excessively long return of the light beam into the axis of the vehicle on leaving the bend. This delay in the change in orientation of the headlights gives rise not only to a lack of comfort for the driver but also a lack of safety since there exists, at each change in orientation of the headlights, a moment during which the road is insufficiently lit. Such a device therefore offers no possibility of anticipation for the driver. However, on roads where there are many bends such as, for example, on mountain roads with successive bends, it is important to be able to anticipate so that the driver knows the geometry of the road a few metres in advance.

Some other known lighting devices use information issuing from a navigation system. This navigation system associates the information supplied by cartography with the indications given by the vehicle GPS. Such a navigation system makes it possible to know the geometry of the road in advance. For example, it is possible to know in advance the bends which will appear on the road at a given distance. It is therefore possible, by relying on the information supplied by the navigation system, to pre-orient the light beams of the vehicle and thus to anticipate the illumination of the road. Such devices are described in particular in the documents EP 780823 and EP 887229. However, current cartography is still very imprecise. It very often happens that, at a given place, the information is absent. This is because there exist entire areas of the country and world which are not covered by the cartography databases. It also happens that the information supplied by the navigation system is aberrant. For example, if the driver has made provision to go to a place A which he has stored in his navigation system and finally, on route, has decided to go to a place B and not to follow the information given by the navigation system, then the information given by this navigation system is incoherent or even contradictory compared with the path actually being followed by the vehicle. In addition, such lighting devices require heavy and relatively expensive means.

There also exist lighting devices using a system of locating the white lines situated on the roads. This system generally uses a camera which takes images of the road seen unfolding in front of the vehicle. The contrast of the white lines on the dark road makes it possible to detect them easily and, according to this detection, to laterally orient the vehicle light beams. However, there are not always white lines on the road and these white lines, if they exist, may be erased or covered by any deposits, such as earth; they can therefore no longer be detected by the detection system.

SUMMARY OF THE INVENTION

The aim of the invention is precisely to remedy the drawbacks of the techniques disclosed above. To this end, the invention proposes a method for detecting the bends on a road with anticipation, using the contrast which there may be between the relatively dark road surface and the more luminous edges of the road. This method has the advantage of being able to be implemented on any road, since any road comprises a surface and verges, or road edges.

More precisely, the invention concerns a method of detecting from a vehicle a variation in path, in particular a bend or straight line, on a road comprising a surface and road edges, characterised in that it comprises the following operations:

taking an image of a road scene unfolding in front of the vehicle and at least partly illuminated by the vehicle, determining, for each pixel in the image, a light decrease gradient, analysing these decrease gradients and determining an image of the road edges, mathematically discriminating the decrease gradients from the image of the road edges, analysing this discrimination and determining the angle of the bend.

The invention also concerns a system for implementing the above method. This system comprises a camera mounted in the vehicle, an image processing unit and a neural network.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIGS. 4A, 4B and 4C depict the various steps of the method of the invention, in a first example of a bend.

DETAILED DESCRIPTION OF EMBODIMENTS OF THE INVENTION

The invention concerns a method for detecting, from a vehicle, with an anticipation of around 30 metres, a bend on a road on which the vehicle is travelling. This method is based on the fact that all the roads on which a vehicle may travel comprise a surface and road edges, also referred to as the verges. The surface is generally dark, because of the bitumen or other materials covering it. Seen by the camera, the road edges are generally lighter, more luminous than the surface, because of the angle of reflection of the light issuing from the headlights in the direction of the camera. The road edges may be grass, earth or pavements. Grass and earth are lighter than the covering of the road surface. The pavements may be stone or covered with a material, generally more luminous than the bitumen on the road surface. In some cases, the pavements are covered with bitumen; in this case, they have a border appearing lighter and indicating the limit between the pavement and the road surface.

The method of the invention therefore proposes to use this contrast between the road edges and the road surface in order to determine the presence of a bend. It is based on the fact that, the road surface being dark, the light emitted by the light beams of the vehicle on the road surface have a tendency to decrease on moving away from the light source. In other words, the further away from the vehicle, the weaker the light on the road surface. On the contrary, on the more luminous road edges, the light emitted by the vehicle has a tendency to be reflected. In other words, the light does not decrease on moving away from the vehicle. There is thus a reversal of contrast between the light on the road surface and the light on the road edges. This reversal of contrast is used, in a first processing, to determine an image of the road edges. This image of the road edges is analysed in order to determine whether there is a bend and, if so, whether it is oriented to the left or to the right of the vehicle.

The method of the invention will now be described in more detail with the help of several examples of roads on which a vehicle may be situated.

Figure 1:
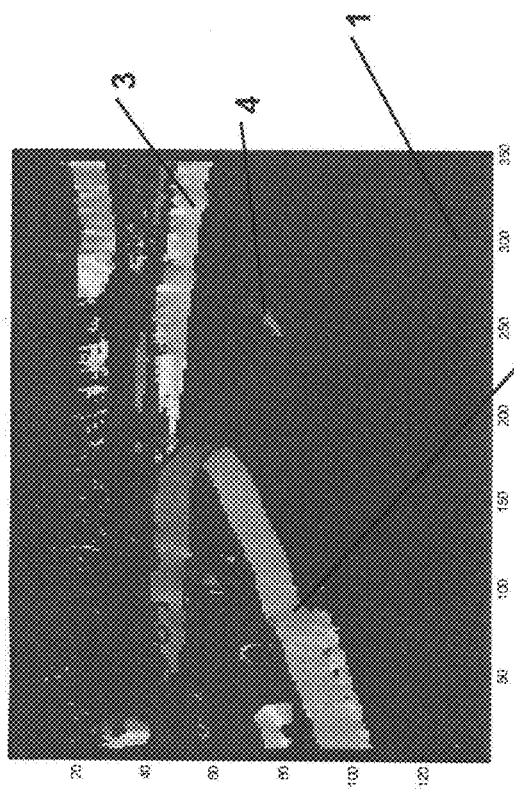
FIG. 1 depicts an example of an image of a road with a surface and road edges.

FIG. 1 shows a first example of a road. More precisely, FIG. 1 shows an image of a road scene taken by a camera installed in the vehicle. This image is a natural image of the road, that is to say an unprocessed image of the road scene unfolding in front of the vehicle. This image depicts a road with a bend to the left. This road comprises a road surface 1, a first road edge 2 situated to the left of the vehicle and a second road edge 3 to the right and front of the vehicle. Part of a broken white line 4, situated at the centre of the road surface 1, can also be seen on this natural image.

The method of the invention comprises a first processing of this natural image which consists of determining the light gradient for each elementary surface of this natural image. For this purpose, the method of the invention proposes to analyse the light level of each pixel (or groups of pixels) in the image as well as the light level of the pixel (or groups of pixels) adjoining the pixel or pixels in question. Thus, considering for example two pixels adjacent to each other, it is possible to determine which of the two pixels receives the most light and thus to determine in which direction the light is varying. A light change vector or light gradient is then allocated to each pixel in the image. When all the vectors of all the pixels in the natural image have been determined, these vectors are analysed in order to determine an image of the road sides. This analysis consists of seeking, amongst all the vectors, those which are oriented in the direction of the vehicle, that is to say in the direction of the source of emission of the light beam of the vehicle and, on the other hand, those which are oriented in the opposite direction, that is to say towards the outside of the road. The vectors corresponding to a value and with a predetermined tolerance are then selected, this value being referred to as the threshold vector. The vectors different from this threshold vector are not taken into consideration for the rest of the processing. On the other hand, the vectors corresponding to this threshold vector are stored for the remainder of the processing.

The threshold vector is predefined. It may be chosen as a reference value with respect to the horizontal. It then forms a reference angle with respect to the horizontal. The threshold vector may also be chosen according to the pixel with the highest gradient, that is to say the pixel whose vector is the most oriented towards the vehicle. The threshold vector then forms a reference angle with respect to the pixel with the highest gradient.

In other words, if first and second pixels situated side by side on the natural image in FIG. 1 are considered, the vector of the first pixel forms an angle with the vector of the second pixel. This angle is compared with the reference angle formed by the threshold vector. For example, if the threshold vector forms an angle of 30° with respect to the horizontal, then all the pixels having a vector forming an angle different from 30°, with a chosen tolerance, are not taken into consideration for the rest of the method.

The method of the invention consists then of constructing an image of the road sides using the information issuing from the analysis of the gradients of the pixels. This image of the road sides is determined by keeping the information supplied by all the pixels (or groups of pixels) whose vector is comparable to the threshold vector. More precisely, the value of these pixels, that is to say their level of grey, is reproduced identically in order to form a processed image. On the other hand, all the pixels whose vector is different from the threshold vector are not reproduced. These pixels are therefore replaced, on the processed image, by black pixels. The image thus formed is the image of the road sides.

Figure 2:
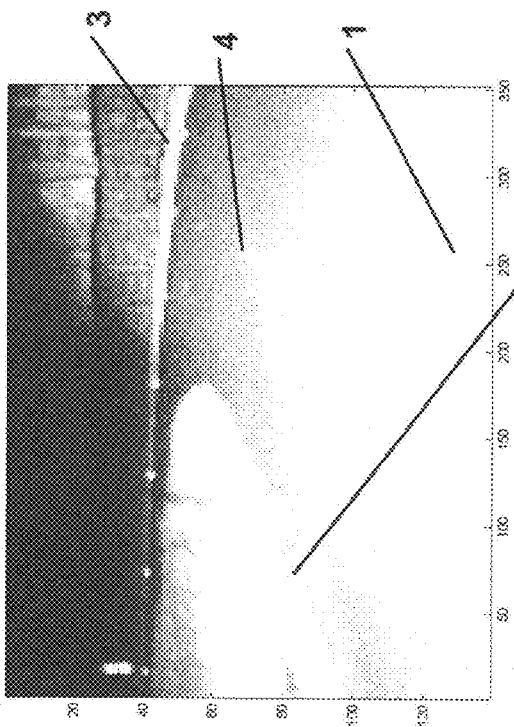
FIG. 2 depicts an image of the road edges obtained after processing of the image in FIG. 1.

An example of an image of the road sides is depicted in FIG. 2. This image of the road sides in FIG. 2 corresponds to the image in FIG. 1 obtained after processing by contrast reversal. This image shows the black areas and grey areas. In fact, only the luminous areas in FIG. 1 appear in this FIG. 2, in contrast with the black areas corresponding to the dark parts of the natural image. In particular, the luminous areas of the image of the road sides correspond to the left-hand road side 2 and to the right-hand road side 3. One of the luminous areas corresponds to the dotted white line 4, in the middle of the dark area which corresponds to the road surface 1.

It is advantageous to eliminate the areas of the image which do not contain information pertinent to the analysis of the bends, by selecting the vectors situated in a horizontal window corresponding to a view of the road lying between 30 m and the horizon approximately.

Figure 3:
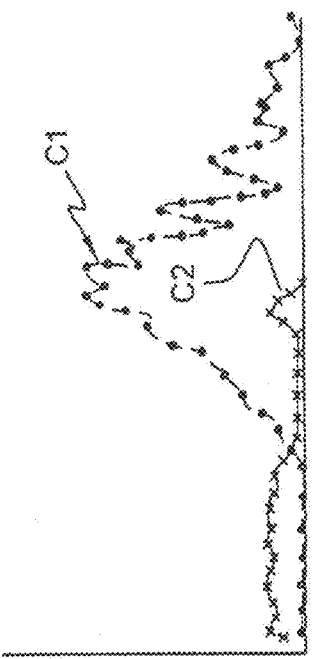
FIG. 3 depicts the curves of the mathematical distributions obtained for the image in FIG. 2.

After obtaining the image of the road sides, the method of the invention then comprises a second processing. This processing consists of effecting a mathematical discrimination of the light gradients. This discrimination is effected using the image of the road sides, on the orientation of the vectors. FIG. 3 depicts the curves obtained by such a mathematical discrimination, for the example of a road in FIGS. 1 and 2.

In the method of the invention, the mathematical discrimination consists of calculating, for each frame of the image of the road sides, the number of pixels (or groups of pixels) whose vector is oriented from the left towards the centre and that where the number of pixels is oriented from the right towards the centre. In other words, for each column of pixels in the image of the road sides, there are calculated firstly the number of pixels whose vector is oriented from the left towards the centre of the image and secondly the number of pixels whose vector is oriented from the right towards the centre of the image. This mathematical discrimination is therefore carried out according to the orientation of the vectors.

In FIG. 3, the curve C1 represented by the dots corresponds to the number of pixels (or groups of pixels) having a decrease vector oriented from the left of the image towards the centre of the image. The curve C2 represented by crosses shows the number of pixels (or groups of pixels) having a decrease vector oriented from the right of the image towards the centre of the image.

According to the distribution of the pixels in the image of the road sides, the existence or not of a bend and its direction are derived therefrom. In other words, the form of these curves C1 and C2 makes it possible to deduce the existence and orientation of a bend on a road. It also makes it possible to deduce the angle of curvature.

In the following examples, FIGS. 3, 4C, 5C, 6C present an X axis reversed with respect to that of the images 1, 2, 4A and 4B, 5A and 5B and 6A and 6B. For example, in FIG. 3, it can be seen that the number of luminous pixels is appreciably greater on the right of the image. It is deduced therefrom that the left-hand road side is more visible in the image than the right-hand road side. It is deduced therefrom that the road has a bend towards the left. Moreover, it can be seen that the curve C2 is non-existent on the left of the image and that it has a peak at the middle of the image; the curve C1 is relatively flat on the left of the image and non-existent on the right. From this statistical distribution of the pixels between the curve C1 and the curve C2, the angle of curvature of the bend is deduced therefrom.

In the method of the invention, these discrimination curves C1 and C2 are analysed by a neural network, or network of neurones, described below.

FIGS. 4A, 4B and 4C depict the main steps of the method of the invention as have just been described, for another example of a bend. In particular, these figures depict respectively a natural image of a road scene, the image of the road sides obtained after a first processing and the discrimination curves obtained after a second processing.

FIG. 4A depicts a natural image of a road having a bend to the right. FIG. 4B shows the image of the road sides obtained for the image in FIG. 4A, after analysis of the contrast reversal.

In this FIG. 4B, only one processing window is shown which comprises the part of the image having the useful information. This processing window corresponds to an embodiment of the method of the invention in which it is chosen to process only the central part of the image, that is to say the part corresponding to the road scene situated between the horizon line and a distance of approximately 30 metres in front of the vehicle. In another embodiment of the invention, it is chosen to process all the image of the road scene.

FIG. 4C shows the discrimination curves C1 and C2 obtained from the image of the road sides. The distribution of the luminous pixels on the curves C1 and C2 shows that the left-hand road side is the most present in the image. It is deduced therefrom that the road has a bend to the right. The proportion of pixels having a vector oriented in one direction or the other makes it possible to determine the angle of curvature of the bend.

Figure 5C:
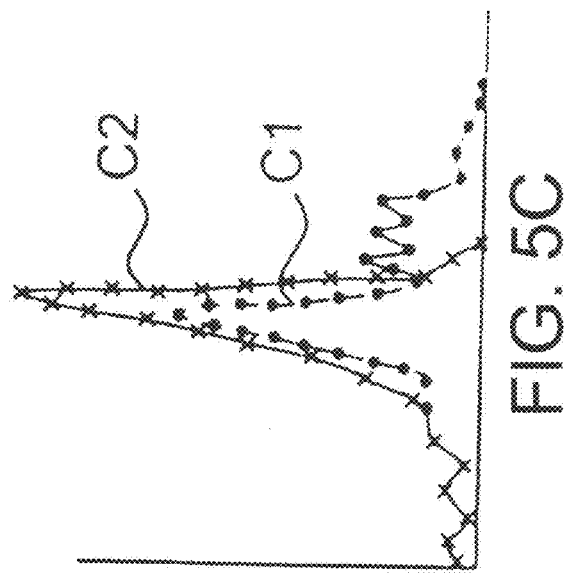
FIGS. 5A, 5B and 5C depict the various steps of the method of the invention, in an example of a road in a straight line.
Figure 5B:
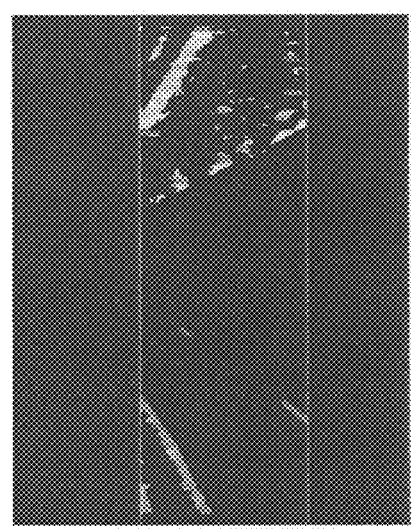
Figure 5A:
Figure 6C:
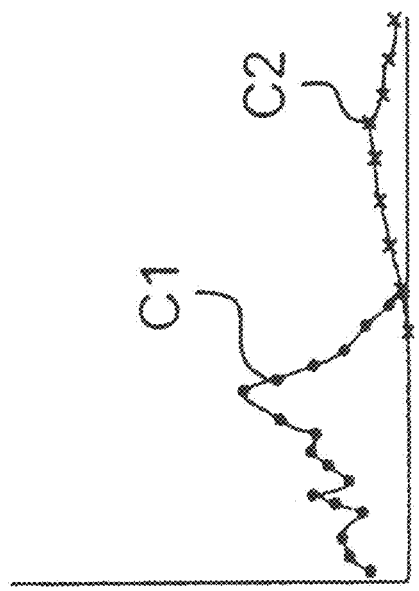
FIGS. 6A, 6B and 6C represent the various steps of the method of the invention, in a second example of a bend.
Figure 6B:
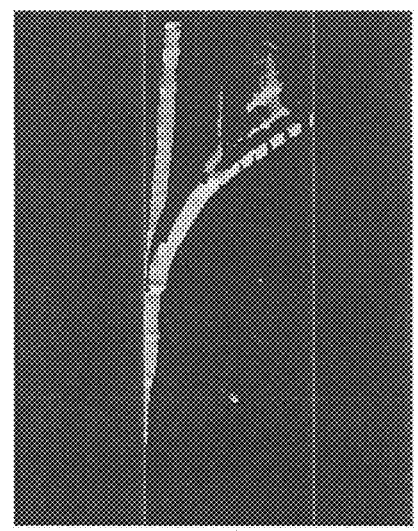
Figure 6A:
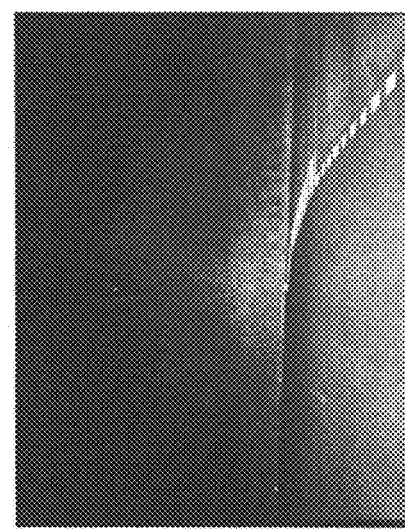

In a similar fashion to FIGS. 4A, 4B and 4C, FIGS. 5A, 5B and 5C as well as FIGS. 6A, 6B and 6C depict respectively the natural image of a road scene, the image of the road sides and the discrimination curves obtained during the method of the invention. FIGS. 5A, 5B and 5C concern an example of a straight road. FIGS. 6A, 6B and 6C concern an example of a bend to the left.

FIG. 5A shows a natural image of a road scene taken by the camera. This road scene is a straight road having a broken white line. FIG. 5B shows the image of the road sides in FIG. 5A, in a processing window. FIG. 5C shows the mathematical discrimination curves C1 and C2 obtained from FIG. 5B. These curves C1 and C2 have a distribution of luminous pixels substantially parallel to one another, without any prominence on one side of the image or the other. It is deduced therefrom that it is a case of a straight road, without a bend to the right or to the left.

FIG. 6A shows a natural image of a road having a "tight" bend to the left. FIG. 6B shows the image of the road sides relating to FIG. 6A, in a processing window. FIG. 6C shows the discrimination curves C1 and C2 obtained from the image of the road sides in FIG. 6B. The distribution of the luminous pixels on the curves C1 and C2 shows that the road has a bend to the left.

The analysis of the curves in FIGS. 3, 4C, 5C and 6C is carried out by a neural network. This neural network is capable of determining, according to the distribution of the luminous pixels in the image and the silhouette of the curves C1 and C2, whether there is a bend in the road and in which direction this bend is oriented. It is also capable of deducing the angle of curvature of this bend.

Figure 7:
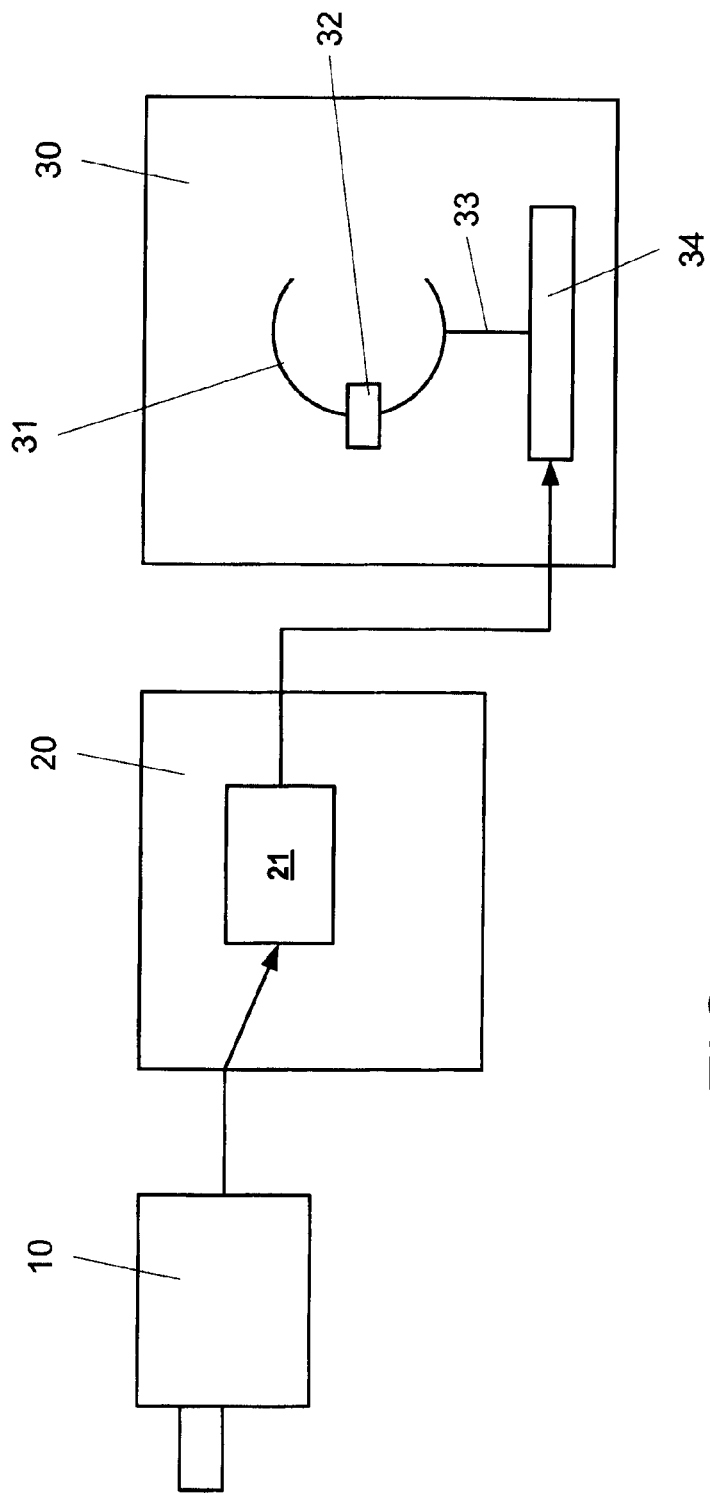
FIG. 7 depicts schematically the system of the invention.

FIG. 7 shows schematically the system of implementing the method of the invention. This system comprises a camera 10 mounted in the vehicle. This camera may be a camera provided initially for another function such as for example night vision. It may for example be an infrared camera.

The system of the invention also comprises an image processing unit 20 installed in the vehicle. This image processing unit may for example be integrated in a microprocessor or in the on-board computer of the vehicle. It may also constitute a dedicated electronic card. This image processing unit 20 is connected to the output of the camera 10. This image processing unit effects the construction of the image of the road sides as well as the discrimination of the pixels in two curves C1 and C2. The system of the invention also comprises a neural network 21. This neural network may constitute a dedicated electronic card or a component of the DSP type inserted in the electronic circuit of the vehicle. This neural network can also be integrated in the image processing unit, as shown in FIG. 7.

Whether or not it be integrated in the image processing unit, the neural network is connected to the headlight 30 of the vehicle and in particular to the motor providing the mobility of the headlight reflector. The neural network thus controls the lateral orientation of the vehicle headlight according to the angle of curvature of the bend detected. Naturally the neural network may simultaneously control the orientation of both vehicle headlights. In this way it is possible to pre-orient the illumination of the road by the vehicle headlights.

The vehicle headlight is a movable headlight, orientable laterally. This headlight 30 comprises a reflector 31 on which a light source is mounted providing the emission of a light beam in front of the vehicle. The reflector 31 is mounted on a movable support 33 rotated by a motor 34. This headlight 30 can be a commercially available movable headlight. It may also be a pre-oriented fixed headlight whose intensity varies according to the angle of the bend, as mentioned at the start of the description.

The neural network used in the system of the invention is of a conventional type. It is a neural network such as is found in various fields of electronics and data processing. In the application of the invention, that is to say the application to the detection of bends on a road, the neural network is capable, according to the proportion of curves C1 and C2 with respect to each other, of determining whether there is a bend and in which direction this bend is oriented. It is also capable of deducing with precision the angle of curvature of the bend. However, like all neural networks, this network must be initialised, that is to say it must learn at the outset various geometries of bends as well as the correlation of these bends with the discrimination curves. In other words, the neural network must learn certain geometries of bends with the vector distribution which corresponds to it. Once this learning is carried out, the neural network is autonomous. It will then self-learn at each new bend detected, that is to say as the neural network analyses the different cases it learns these cases so as to be able to determine more rapidly and with even more precision the geometry of the bends which it will subsequently determine.

The bend detection method which has just been described has the advantage of making it possible to determine the angle of curvature of the bend with relative precision. This precision is around 2°. It thus makes it possible to anticipate the entry to or exit from a bend by approximately 30 metres, with good precision.

This method also has the advantage of being insensitive to other illuminations, such as lighting from passing vehicles or urban lighting.

The method of the invention is designed solely for lateral orientation of vehicle headlights. However, when the chassis of the vehicle is not perfectly parallel to the road, that is to say when the attitude of the vehicle is not horizontal, the case of a vehicle leaning forwards when it is braking or which is leaning to the rear because of a badly distributed load in the vehicle, the method of the invention can be implemented by moving the processing window upwards or downwards, so that the part of the image processed corresponds to the road scene useful for the processing of a signal. This change may be effected by virtue of a signal issuing from the attitude correction system.

In one embodiment of the invention, the system of the invention can choose not to take account of the information supplied by the neural network. In this case, a degraded control mode is chosen which consists of taking as information that supplied by the sensor on the steering wheel. This degraded mode may be chosen, for example, in the case where the vehicle is situated on a very wide road, in a very large flat plain, or where there is little relief and no road sides detectable by the camera. It should be noted, however, that such roads are very rare in our regions.

In a variant of the invention, the system comprises a flash which can be used at the exit from a bend so as to illuminate the road for a very short time, which makes it possible to know what will be the geometry of the road at more than 30 metres. Such a flash may be useful, for example, in areas with successive bends such as mountain roads. This system then affords anticipation appreciably greater than 30 metres.

The invention claimed is:

1. A method of detecting from a vehicle variations in path on a road having a surface and road edges comprising:
   at least partly illuminating a road scene near the vehicle;
   taking an image of a road scene having a plurality of pixels;
   determining, for each of the pixels in the image, a light decrease gradient;
   analyzing these light decrease gradients and determining an image of the road edges;
   calculating a number of the pixels of the image whose light decrease gradient is oriented from a left towards a center of the image and a number of the pixels of the image whose light decrease gradient is oriented from a right towards the center of the image; and
   determining an angle of a bend of the road by comparing a distribution of luminosity of the pixels.

2. A method according to claim 1, wherein the light decrease gradient of an elementary image part corresponds to a decrease vector of light formed between adjacent pixels.

3. A method according to claim 2, wherein the analysis of the light decreases gradients comprises a thresholding of the decrease vectors and an elimination of the decrease vectors outside the threshold.

4. A method according to claim 2, wherein the analysis step comprises counting a number of elementary image parts having a vector oriented in one direction and a number of elementary image parts have decrease vector oriented in an opposite direction.

5. A method according to claim 3, wherein the calculating of the number of the pixels is carried out pixel column by pixel column, or by groups of pixel columns.

6. A method according to claim 1, wherein the analysis is carried out by a neural network.

7. A method according to claim 6, wherein the neural network has previously learnt geometries of bends and corresponding distributions of luminosity of the pixels.

8. A system for detecting a bend in a road from a vehicle implementing the method according to claim 1, comprising a camera mounted in the vehicle, an image processing unit and a neural network.

9. A system of detecting a bend according to claim 8, wherein the neural network is integrated in the image processing unit.

10. A system for detecting a bend according to claim 8 that is connected to a vehicle headlight, movable or fixed and modulated for intensity.

11. A method according to claim 3, wherein the analysis step comprises counting a number of elementary image parts having a vector oriented in one direction and a number of elementary image parts have a decrease vector oriented in an opposite direction.

12. A method according to claim 2, wherein the analysis is carried out by a neural network.

13. A method according to claim 3, wherein the analysis is carried out by neural network.

14. A method according to claim 4, wherein the analysis is carried out by neural network.

15. A method according to claim 5, wherein the analysis is carried out by neural network.

16. A method according to claim 1, wherein the neural network has previously learnt geometries of bends and corresponding distributions of luminosity of the pixels.

17. A method according to claim 2, wherein the neural network has previously learnt geometries of bends and corresponding distributions of luminosity of the pixels.

18. A method according to claim 3, wherein the neural network has previously learnt geometries of bends and corresponding distributions of luminosity of the pixels.

19. A method according to claim 4, wherein the neural network has previously learnt geometries of bends and corresponding distributions of luminosity of the pixels.

20. A method according to claim 5, wherein the neural network has previously learnt geometries of bends and corresponding distributions of luminosity of the pixels.

21. A system for detecting a bend in a road from a vehicle implementing the method according to claim 2 comprising a camera mounted in the vehicle, an image processing unit and a neural network.

22. A system for detecting a bend in a road from a vehicle implementing the method according to claim 3 comprising a camera mounted in the vehicle, an image processing unit and a neural network.

23. A system for detecting a bend in a road from a vehicle implementing the method according to claim 4 comprising a camera mounted in the vehicle, an image processing unit and a neural network.

24. A system for detecting a bend in a road from a vehicle implementing the method according to claim 5 comprising a camera mounted in the vehicle, an image processing unit and a neural network.

25. A system for detecting a bend in a road from a vehicle implementing the method according to claim 6 comprising a camera mounted in the vehicle, an image processing unit and a neural network.

26. A system for detecting a bend in a road from a vehicle implementing the method according to claim 7 comprising a camera mounted in the vehicle, an image processing unit and a neural network.

27. A system for detecting a bend according to claim 9 that is connected to a vehicle headlight, movable or fixed and modulated for intensity.

28. A method according to claim 1, further comprising controlling lateral orientation of at least one vehicle headlight based on the determination of the angle of the road.

29. A method according to claim 1, wherein the analysis step comprises generating a first curve corresponding to the number of the pixels having a decrease vector oriented from the left of the image towards the center of the image, and generating a second curve corresponding to the number of the pixels having a decrease vector oriented from the left of the image towards the center of the image.

30. A method according to claim 29, wherein the step of analyzing comprises deducing a shape of the road ahead based on a form of the first and second curves.

* * * * *